US012049384B2

(12) United States Patent
Ou et al.

(10) Patent No.: US 12,049,384 B2
(45) Date of Patent: Jul. 30, 2024

(54) ELEVATOR SAFETY CLAMP CONTROL DEVICE, ELEVATOR SAFETY APPARATUS AND ELEVATOR SYSTEM

(71) Applicant: Otis Elevator Company, Farmington, CT (US)

(72) Inventors: Yuhang Ou, Hangzhou (CN); Zhenyan Tong, Shanghai (CN)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 17/982,121

(22) Filed: Nov. 7, 2022

(65) Prior Publication Data

US 2024/0067499 A1 Feb. 29, 2024

(30) Foreign Application Priority Data

Aug. 25, 2022 (CN) ......................... 202211025188.6

(51) Int. Cl.
*B66B 5/18* (2006.01)
*B66B 5/04* (2006.01)

(52) U.S. Cl.
CPC . *B66B 5/18* (2013.01); *B66B 5/04* (2013.01)

(58) Field of Classification Search
CPC .... B66B 5/18; B66B 5/04; B66B 5/22; B66B 5/20; B66B 5/16
See application file for complete search history.

(56) References Cited

U.S. PATENT DOCUMENTS 6,564,907 B1 * 5/2003 Sasaki ........................ B66B 5/22 187/373
7,128,189 B2 * 10/2006 Maury ...................... B66B 5/18 187/373

(Continued)

FOREIGN PATENT DOCUMENTS

CN 101679001 A * 3/2010 ............... B66B 5/20
CN 112520531 A * 3/2021 ............. B66B 5/044

(Continued)

OTHER PUBLICATIONS

Machine translation of the description of CN-101679001-A. Maruyama. (Year: 2010).*

(Continued)

*Primary Examiner* — Michael R Mansen
*Assistant Examiner* — Michelle M Lantrip
(74) *Attorney, Agent, or Firm* — CANTOR COLBURN LLP

(57) ABSTRACT

An elevator safety clamp control device, an elevator safety apparatus and an elevator system. The elevator safety clamp control device includes an operating portion arranged on a running device running along an elevator guide rail and connected to an elevator safety clamp, the operating portion release kinetic energy when controlled to enter a second state from a first state of energy storage, for actuating the elevator safety clamp to engage with the elevator guide rail to stop the running device; a control portion configured to control the operating portion to be in the first state, and to control the operating portion to enter the second state from the first state to release kinetic energy when an operating parameter of the running device exceeds a threshold; and a power portion arranged on the running device and connected to the operating portion.

13 Claims, 3 Drawing Sheets

(56) References Cited

U.S. PATENT DOCUMENTS

| | | | | |
|---|---|---|---|---|
| 10,669,123 | B2 * | 6/2020 | Virta | B66B 5/16 |
| 2015/0353321 | A1 * | 12/2015 | Fargo | B66B 5/22 187/359 |
| 2018/0072536 | A1 | 3/2018 | Husmann | |
| 2019/0308846 | A1 * | 10/2019 | Koskinen | B66B 5/0087 |
| 2020/0198932 | A1 * | 6/2020 | Hallikainen | B66B 7/044 |
| 2021/0354956 | A1 * | 11/2021 | Bae | B66B 11/0206 |
| 2022/0380176 | A1 * | 12/2022 | Kubo | B66B 5/22 |

FOREIGN PATENT DOCUMENTS

| | | | | | |
|---|---|---|---|---|---|
| CN | 113071970 | A | * | 7/2021 | B66B 5/22 |
| CN | 114014125 | A | * | 2/2022 | |
| CN | 114455423 | A | * | 5/2022 | |
| WO | 2005044709 | A1 | | 5/2005 | |
| WO | 2019176160 | A1 | | 9/2019 | |
| WO | WO-2020110316 | A1 | * | 6/2020 | B66B 5/044 |

OTHER PUBLICATIONS

European Search Report for Application No. 22208418.8, Issued Aug. 11, 2023, 10 Pages.

* cited by examiner

ELEVATOR SAFETY CLAMP CONTROL DEVICE, ELEVATOR SAFETY APPARATUS AND ELEVATOR SYSTEM

FOREIGN PRIORITY

This application claims priority to Chinese Patent Application No. 202211025188.6, filed Aug. 25, 2022, and all the benefits accruing therefrom under 35 U.S.C. § 119, the contents of which in its entirety are herein incorporated by reference.

TECHNICAL FIELD

The present disclosure relates to the technical field of electromechanical equipment, in particular to an elevator safety clamp control device, an elevator safety apparatus and an elevator system.

BACKGROUND

In many places such as business offices, manufacturing sites, residential buildings, especially in many high-rise buildings, various elevator systems have been widely installed and used to transport people, pets and goods, etc., and people have thus obtained great convenience therefrom. In these elevator systems, elevator car and counterweight are generally arranged in the elevator hoistway, and they will run along the guide rails of the hoistway during use, carrying the objects to the target floor through the elevator car.

For various reasons, these elevator systems may have safety issues during use. For this reason, there are many technical means related to such safety issues in the prior art to provide guarantees. For example, most of the existing elevator systems are provided with safety devices such as safety clamps. In abnormal situations such as overspeed or exceeding of the limit height during operation of the elevator, the elevator car can be immediately braked with the help of such safety devices, so as to avoid unexpected equipment damage, personal injury and other accidents. However, existing elevator safety devices have shortcomings in aspects such as construction, installation arrangement, operational control, safety reliability, and manufacturing cost.

SUMMARY

In view of the foregoing, the present disclosure provides an elevator safety clamp control device, an elevator safety apparatus and an elevator system, so as to solve or at least alleviate one or more of the aforementioned problems and other problems in the prior art, or to provide alternative technical solutions to the prior art.

According to one aspect of the present disclosure, an elevator safety clamp control device is firstly provided, which comprises:

an operating portion arranged on a running device running along an elevator guide rail and connected to an elevator safety clamp, wherein the operating portion releases kinetic energy when controlled to enter a second state from a first state of energy storage, for actuating the elevator safety clamp to engage with the elevator guide rail to stop the running device;

a control portion configured to control the operating portion to be in the first state, and to control the operating portion to enter the second state from the first state to release kinetic energy when an operating parameter of the running device exceeds a threshold; and a power portion arranged on the running device and connected to the operating portion, wherein the power portion is configured to provide power to bring the operating portion into the first state and to reset the elevator safety clamp.

In the elevator safety clamp control device according to the present disclosure, optionally, the operating portion comprises an elastic energy storage component, and the elevator safety clamp is arranged on a frame structure of the running device and is connected to the elastic energy storage component and a power output end of the power portion through a rotatable connecting rod.

In the elevator safety clamp control device according to the present disclosure, optionally, the elastic energy storage component is a spring sleeved on the connecting rod, with one end of the spring mounted on the connecting rod and the other end mounted on the frame structure.

In the elevator safety clamp control device according to the present disclosure, optionally, the control portion comprises a first component and a second component, and the first component and the second component are respectively arranged on the frame structure and the connecting rod and are configured to be operatively engaged, such that when they are engaged, the operating portion is in the first state, and when disengaged, the operating portion is brought into the second state from the first state to release kinetic energy.

In the elevator safety clamp control device according to the present disclosure, optionally, the control portion is connected to a detector and is configured to determine whether the operating parameter of the operating device exceeds the threshold according to a signal from the detector, and wherein the detector comprises a speed sensor, an acceleration sensor or an elevator control system arranged in an elevator system, and the operating parameter comprises running speed data, running acceleration, or a combination thereof.

In the elevator safety clamp control device according to the present disclosure, optionally, the power portion is connected to an elevator control system in an elevator system, and is configured to provide power according to a signal from the elevator control system.

In the elevator safety clamp control device according to the present disclosure, optionally, the power portion comprises a motor, the motor and the elevator safety clamp are arranged on the frame structure of the running device, an output shaft of the motor is connected to the elevator safety clamp through a rotatable connecting rod, and the operating portion is connected to the connecting rod.

In the elevator safety clamp control device according to the present disclosure, optionally, two or more elevator safety clamps are respectively arranged on the frame structure of the running device, and wherein the power portion, the control portion and the operating portion are arranged inside the frame structure, and the power portion is connected to the elevator safety clamps through ends of the rotatable connecting rod respectively.

In the elevator safety clamp control device according to the present disclosure, optionally, the power portion is centrally arranged inside the frame structure, and a corresponding control portion and a corresponding operating portion are respectively provided between the power portion and each elevator safety clamp.

In the elevator safety clamp control device according to the present disclosure, optionally, the elevator safety clamp control device further comprises a clutch arranged between the power portion and the operating portion, such that after the operating portion is brought into the first state when powered by the power portion, the operating portion is disconnected from the power portion by operating the clutch, and when it is necessary to bring the operating portion into the first state or reset the elevator safety clamp, a connection is formed between the operating portion and the power portion by operating the clutch.

In the elevator safety clamp control device according to the present disclosure, optionally, the elevator safety clamp is arranged on the frame structure of the running device and is connected to the operating portion and the power output end of the power portion through a rotatable connecting rod, and the clutch is arranged on the connecting rod.

In the elevator safety clamp control device according to the present disclosure, optionally, the running device is an elevator car and/or a counterweight.

In the elevator safety clamp control device according to the present disclosure, optionally, the elevator safety clamp control device is arranged inside a frame structure of the elevator car, and the elevator safety clamp is arranged on the frame structure of the elevator car.

Secondly, according to another aspect of the present disclosure, an elevator safety apparatus is further provided, which comprises:

- at least one elevator safety clamp arranged on a running device running along an elevator guide rail, wherein the elevator safety clamp, when actuated, engages with the elevator guide rail to stop the running device; and
- the elevator safety clamp control device according to any of the above, which is configured to control the elevator safety clamp.

In addition, according to yet another aspect of the present disclosure, an elevator system is further provided, which comprises:

- a hoistway provided with an elevator guide rail;
- a running device arranged inside the hoistway and running along the elevator guide rail, wherein the running device is provided with at least one elevator safety clamp which, when actuated, engages with the elevator guide rail to stop the running device; and
- the elevator safety clamp control device according to any of the above, which is configured to control the elevator safety clamp.

According to the solutions of the present disclosure, the working performance of the elevator safety device can be effectively improved, and the safety performance of the elevator system can be ensured and enhanced. Therefore, safety protection measures can be quickly and reliably taken in the event of overspeed of the elevator car or the counterweight so as to avoid accidents. The present disclosure has the advantages of easy manufacture, installation and maintenance, relatively reliable working performance, and low manufacturing cost. It is very suitable for being widely applied in various places where elevators are used.

BRIEF DESCRIPTION OF THE DRAWINGS

The technical solutions of the present disclosure will be described in further detail below with reference to the accompanying drawings and embodiments. However, it should be understood that these drawings are designed merely for the purpose of explanation and only intended to conceptually illustrate the structural configurations described herein, and are not required to be drawn to scale.

DETAILED DESCRIPTION

Firstly, it should be noted that the structural composition, characteristics, advantages and the like of the elevator safety clamp control device, elevator safety apparatus and elevator system according to the present disclosure will be described below by way of examples. However, none of the descriptions should be understood as limiting the present disclosure in any way.

In the text, the technical terms "first" and "second" are only used for the purpose of distinguishing and are not intended to indicate the order and relative importance thereof. The technical term "connected" means that a specific component is directly connected to another component and/or indirectly connected to another component. The technical term "component" is intended to encompass any possible form in terms of structural configuration, composition, etc., for example, it may be composed of single or multiple parts.

In addition, for any single technical feature described or implied in the embodiments mentioned herein, or any single technical feature shown or implied in individual drawings, the present disclosure still allows for any combination or deletion of these technical features (or equivalents thereof) without any technical obstacle. Therefore, it should be considered that these more embodiments according to the present disclosure are also within the scope recorded in this document. Furthermore, general matters already known to those skilled in the art, such as the basic structures and working principles of elevator control systems, sensors, clutches, safety clamps, etc., will not be repeated here.

Figure 1:
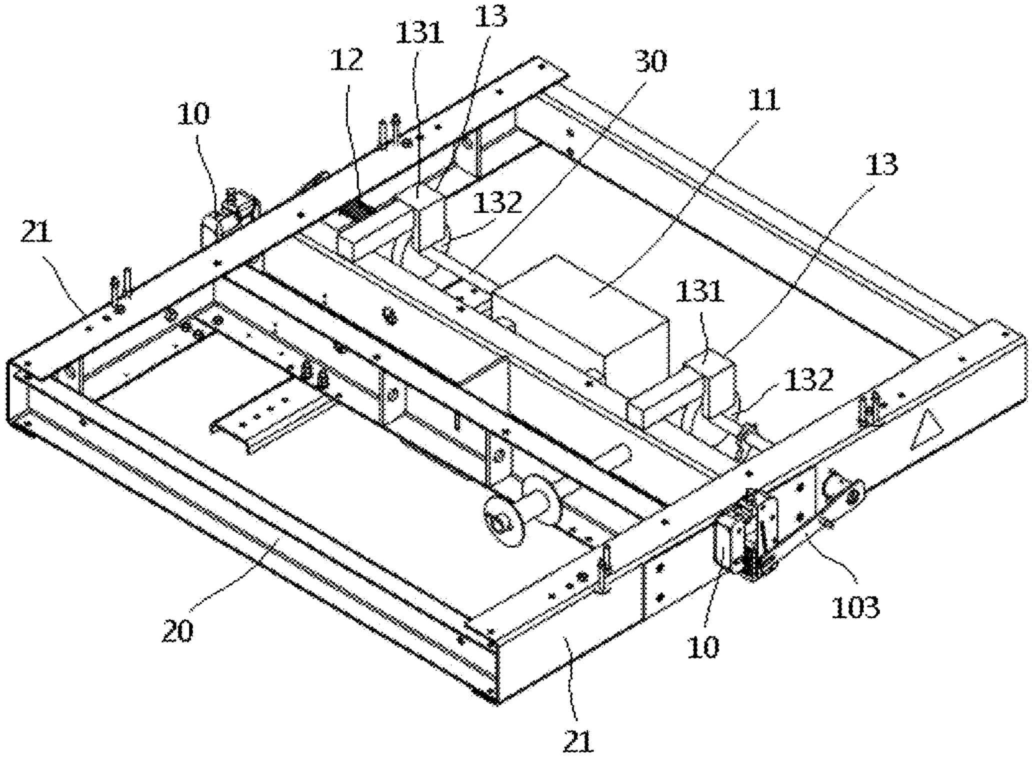
FIG. 1 is a partial structural schematic diagram of an embodiment of the elevator safety clamp control device according to the present disclosure after being installed in an elevator system.
Figure 2:
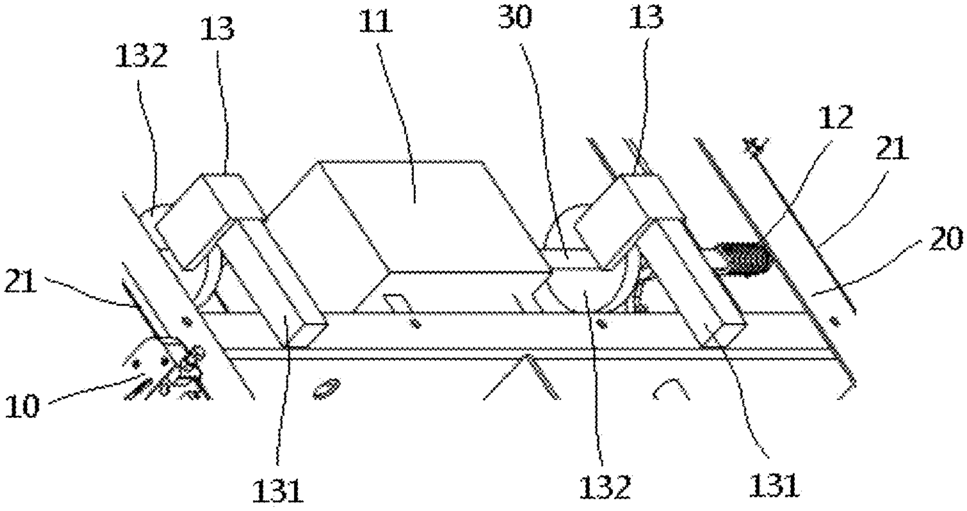
FIG. 2 is a partial structural schematic diagram of the embodiment shown in FIG. 1, in which components such as a power portion, a control portion, and an operating portion located on the right side are shown.
Figure 3:
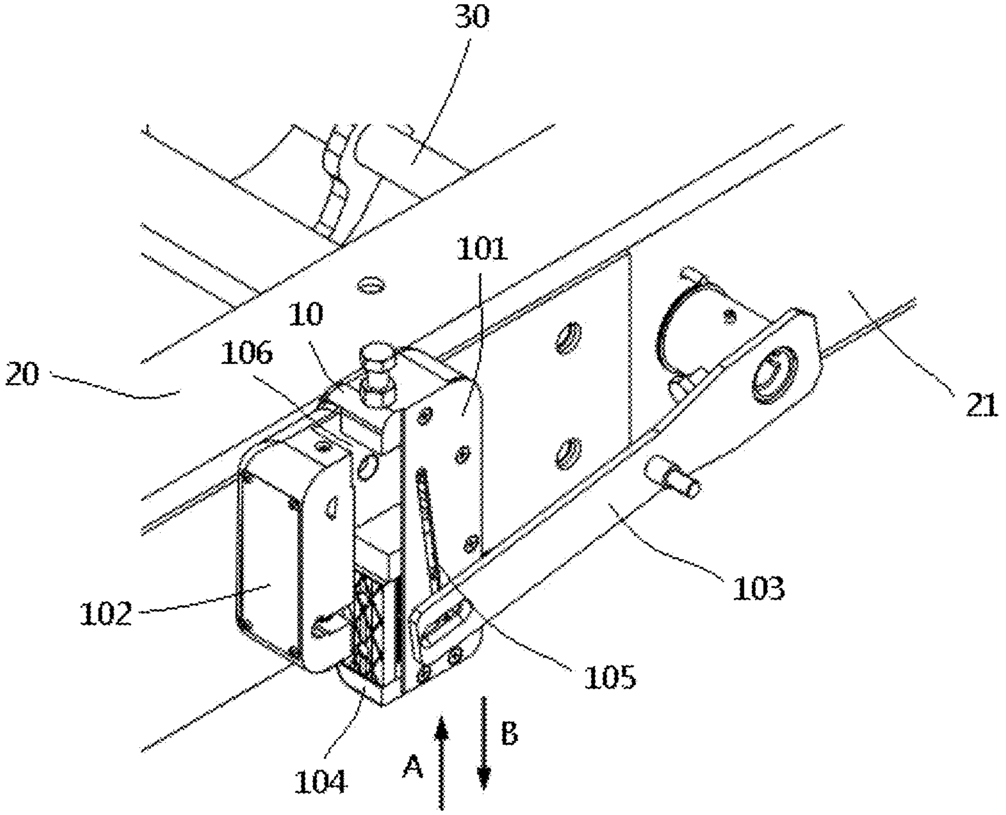
FIG. 3 is another partial structural schematic diagram of the embodiment shown in FIG. 1, in which components such as a connecting rod and an elevator safety clamp located on the right side are shown.

Referring to FIGS. 1 to 3, these figures exemplarily show the general situation after installation and application of an embodiment of the elevator safety clamp control device of the present disclosure. In order to simplify the drawings, only a part of the structural configuration of the whole system is shown in FIGS. 1 to 3. The device of the present disclosure will be described in detail below in conjunction with this embodiment.

In this embodiment of the elevator safety clamp control device, a power portion 11, an operating portion 12 and a control portion 13 may be provided for controlling an elevator safety clamp 10. As for the elevator safety clamp 10, as an exemplary description only, it is specifically illustrated as a wedge type safety clamp in the drawings. However, it should be understood that the solution according to the present disclosure allows the use of the elevator safety clamp control device to control elevator safety clamp in any possible form, such as eccentric wheel type safety clamp or roller type safety clamp, etc.

Specifically, the power portion 11 can be installed on the running device (e.g., elevator car, counterweight) in the elevator system to provide power. The running device will run along the guide rails of the elevator hoistway under the action of a traction machine and other equipment. The power portion 11 may be optionally mounted on a frame structure 20 of the running device, for example, arranged inside a frame structure of the elevator car, which has been exemplarily shown in FIG. 1. In this way, the existing space of the elevator system can be fully utilized, which is conducive to forming an overall compact layout.

In specific applications, the power portion 11 can be implemented by any suitable power equipment such as a motor and a hydraulic press, and its specific power, volume, and installation method can be selected and set according to actual needs. The operation of the power portion 11 can be controlled by a separate controller or an existing controller in the elevator system, for example, the power portion 11 can be controlled to provide power as required through a signal from the elevator control system. The controller may be implemented using a general-purpose microprocessor executing a computer program stored on a storage medium to perform the operations described herein. Alternatively, the controller may be implemented in hardware (e.g., ASIC, FPGA) or in a combination of hardware/software. The power output from the power portion 11 can be provided to the operating portion 12, the elevator safety clamp 10 or other parts in the system. For example, the aforementioned power is used to energize the operating portion 12 and reset the elevator safety clamp 10, etc., which will be described in greater detail below.

The operating portion 12 is configured to operate the elevator safety clamp 10 in the case of, for example, overspeed of the running device, so as to ensure the safety of the elevator and avoid accidents. The operating portion 12 can be mounted on the running device, for example, arranged on the respective frame structure of the elevator car and/or the counterweight. When in use, the operating portion 12 can receive the power from the power portion 11 to enter the first state of energy storage, and then can be controlled to enter the second state when needed, so that the stored energy is released in the above process of state transition. According to the solutions of the present disclosure, the released energy can be fully utilized to quickly actuate the elevator safety clamp 10 to engage with the elevator guide rail, so that the running device can be quickly stopped on the elevator guide rail, thereby achieving the goal of guaranteeing the elevator safety through control of the elevator safety clamp 10.

With reference to FIGS. 1 and 2, as an optional embodiment, the operating portion 12 may be provided with an elastic energy storage component, for example, one or more springs (e.g., torsion spring) may be conveniently adopted. Such elastic energy storage component has elastic deformation energy storage capacity, which can realize operations involving energy storage or release. As an example, a spring can be, for example, sleeved on a rotatable connecting rod 30 located on the running device, with one end of the spring mounted on the connecting rod 30, and the other end mounted on the frame structure 20 of the running device, thereby forming a feasible implementation of the operating portion 12. As shown in FIGS. 1 to 3, the connecting rod 30 can be connected to the power portion 11 and the elevator safety clamp 10. More specifically, it can be connected to the power output end of the power portion 11 (e.g., the output shaft of the motor) and a lifting mechanism 103 in the elevator safety clamp 10, respectively. When it is necessary to provide power to the operating portion 12, the power transmitted from the power output end of the power portion 11 can be utilized to push the connecting rod 30 to rotate relative to the frame structure 20, and then the connecting rod 30 drives the spring to generate torsional deformation to enter the first state for energy storage, i.e., by forcing the spring into torsional deformation to store potential energy. Subsequently, once the spring is controlled to enter the second state from the first state, the stored energy imparted to the operating portion 12 in the form of the exemplary spring via the power portion 11 will be released to generate kinetic energy, which can therefore be used for actuating the elevator safety clamp 10.

It should be noted that, different from the commonly-used method for actuating the elevator safety clamp in existing elevator systems (i.e., the industry is accustomed to actuating the elevator safety clamp by immediately starting the motor after it is determined that an abnormal situation occurs), the solutions of the present disclosure innovatively adopts the method of pre-storing the required energy and quickly releasing it once it needs to be used, which significantly reduces the adverse blocking effect compared with using the traditional motor operation method, thereby making it possible to bring the elevator safety clamp into the working state to take the safety protection actions in a more rapid, efficient and stable manner, which effectively improves the safety protection level of the elevator system.

In this embodiment of the elevator safety clamp control device, the control portion 13 cooperates with the power portion 11 and the operating portion 12, through which the operating portion 12 can be controlled and maintained in the first state (prevention operation), and when necessary, the operating portion 12 can be made to transit from the first state to the second state (release operation). For example, when an elevator safety event occurs, such as the running parameter of the running device (e.g., running speed data, running acceleration or a combination thereof, etc.) exceeding a preset threshold (which can be set according to the specific application), a corresponding control operation from the control portion 13 can release the stored energy of the operating portion 12 in the previous first state for actuating the elevator safety clamp 10. Through the above cooperative operation of the control portion 13 and the operating portion 12, the elevator safety clamp control device and the elevator safety clamp can form a unique self-locking function with extremely high reliability.

Following the above design idea of the solutions of the present disclosure, the control portion 13 can be implemented in many ways. For example, in one or more embodiments, such as shown in FIGS. 1 and 2, the control portion 13 may be optionally provided with a component 131 and a component 132, which may be respectively mounted on the frame structure 20 of the running device and the connecting rod 30. Both components 131 and 132 may be operatively engaged, for example, they may optionally be in the form of controlled frictional engagement using brake pads, brake discs, etc., or the like. When the components 131 and 132 are operated to be engaged with each other as required by the application, the operating portion 12 (e.g., the aforementioned spring) can be controlled and restricted to be in the first state with energy storage characteristic, that is, the operating portion 12 is prevented from getting away from the first state. In contrast, when components 131 and 132 are operated to be disengaged from each other as required by the application, the operating portion 12 (e.g., the aforementioned spring) will be brought into the second state from the previously controlled and maintained first state, so that the energy stored in the first state is released, thereby actuating the elevator safety clamp 10 from the initial state to the working state to engage with the elevator guide rail. As a result, the running device can be stopped on the elevator guide rail in a rapid, safe and reliable manner to avoid unexpected accidents.

The control signal that can be provided to the control portion 13 is used to determine whether the running parameter of the running device exceeds a corresponding threshold, so that the control portion 13 can control the operating portion 12 accordingly. Such control signals may be obtained through detectors. The detectors may include, but are not limited to, for example, speed sensors, acceleration sensors or elevator control systems etc. arranged in the elevator system. For example, one or more speed sensors (and/or one or more acceleration sensors) may be mounted at any suitable locations in the elevator system, either alone or in combination, as required by the application, such as arranged on the elevator car, the counterweight, the inner wall of the hoistway, and the like. Of course, it is also possible to directly obtain the information related to the running parameter of the running device from the control part, such as the elevator control system, in the elevator system, and then use it as the aforementioned control signal for the control portion 13.

The composition and structure of the elevator safety clamp control device of the present disclosure have been described in detail above with reference to the embodiment shown in FIGS. 1 to 3. The use and working principle of the elevator safety clamp control device will be continued to be introduced below, so that the solutions of the present disclosure will be more clearly understood.

First of all, in the initial use, the energizing operation can be carried out by operating the power portion 11 to provide power to the operating portion 12 as required, that is, the operating portion 12 is made to enter the first state of energy storage. At this time, the control portion 13 can be operated to carry out the aforementioned release operation, that is, the control portion 13 will not carry out the prevention operation on the operating portion 12 at this time. After the operating portion 12 has been energized to be in the first state, the prevention operation can be carried out by operating the control portion 13, that is, the operating portion 12 is controlled to be kept in the first state all the time. For example, referring to the specific example of FIGS. 1 and 2, the spring at this time will be placed in a state of energy storage, and the two components 131 and 132 in the control portion 13 are in an engaged state to prevent the connecting rod 30 from rotating, thereby preventing the spring connected to the connecting rod 30 from rotating so as to prevent it from getting out of the current state of energy storage. After the power supply to the operating portion 12 is completed, the power portion 11 can be placed in a stop state, or in a sleep/standby state (if with this function) so as to wake up and run immediately when needed. With continued reference to the specific example of FIG. 3, which shows the general situation when the elevator safety clamp 10 is in the initial state, at this time, a safety clamp wedge 104 is at the lowermost position, and the end of the lifting mechanism 103 connected to the safety clamp wedge 104 is also at the lowermost position. Due to the preventing effect from the control portion 13 on the operating portion 12, the lifting mechanism 103 and the safety clamp wedge 104 are also restricted in place and will not move upward accordingly.

During operation of the elevator, once the running parameter of the running device exceeds the threshold, this will be detected by the detectors mentioned above and the corresponding signal will be sent to the control portion 13, which will then remove the previous preventing operation on the operating portion 12. That is, the operating portion 12 will be allowed to transit from the first state to the second state at this time and thus release the pre-stored energy, thereby causing the elevator safety clamp 10 to be quickly actuated into the working state. For example, referring to the specific example of FIG. 3, since the restriction on the movement of the spring and the connecting rod 30 by the control portion 13 is removed at this time, the energy originally stored by the spring will be released to generate kinetic energy to push the connecting rod 30 to start to rotate, and then the connecting rod 30 drives the lifting mechanism 103 to rotate together, so that the safety clamp wedge 104 is driven to move upward with the lifting mechanism 103 following the path defined by a guide groove 105 in the direction indicated by the arrow A in FIG. 3. This will cause the gap of an intermediate passage 106 formed by a first part 101 and a second part 102 located on both sides of the elevator safety clamp 10 to become smaller and smaller, until the safety clamp wedge 104 contacts the elevator guide rail and clamps the current section of the elevator guide rail within the intermediate passage 106 together with the second part 102, thereby finally bringing the running device to a safe stop on the elevator guide rail.

When the current working state of the elevator safety clamp 10 needs to be removed, that is, the elevator safety clamp 10 needs to be reset, the power portion 11 can be turned on to power the elevator safety clamp 10 to complete the reset operation. For example, in conjunction with the specific example shown in FIGS. 1 to 3, the power provided by the power portion 11 can be used to drive the connecting rod 30 to rotate, and then the safety clamp wedge 104 can be driven by the lifting mechanism 103 to move downward following the path defined by the guide groove 105 in the direction indicated by the arrow B in FIG. 3 to disengage from the elevator guide rail until it returns to its initial position, so that the elevator safety clamp 10 returns to the initial state.

Then, the operating portion 12 can be energized by operating the power portion 11 to provide power as described above, so that the operating portion 12 can reenter the first state of energy storage, and the operating portion 12 can be kept in the first state all the time through the control portion 13, thereby making preparations for the next possible actuation operation of the elevator safety clamp 10, and the cycle continues.

It can be understood that, when the power portion 11 adopts a motor device, by controlling the motor device to perform forward and reverse running operations in opposite directions, the aforementioned energization operation for the operating portion and reset operation for the elevator safety clamp can be very conveniently realized, respectively.

By referring to the example of the elevator safety clamp control device shown in FIGS. 1 to 3, the basic information of the device of the present disclosure has been described in detail above. However, it should be noted that various possible flexible designs, changes and adjustments are allowed to be made according to the actual application situation without departing from the gist of the present disclosure.

Figure 4:
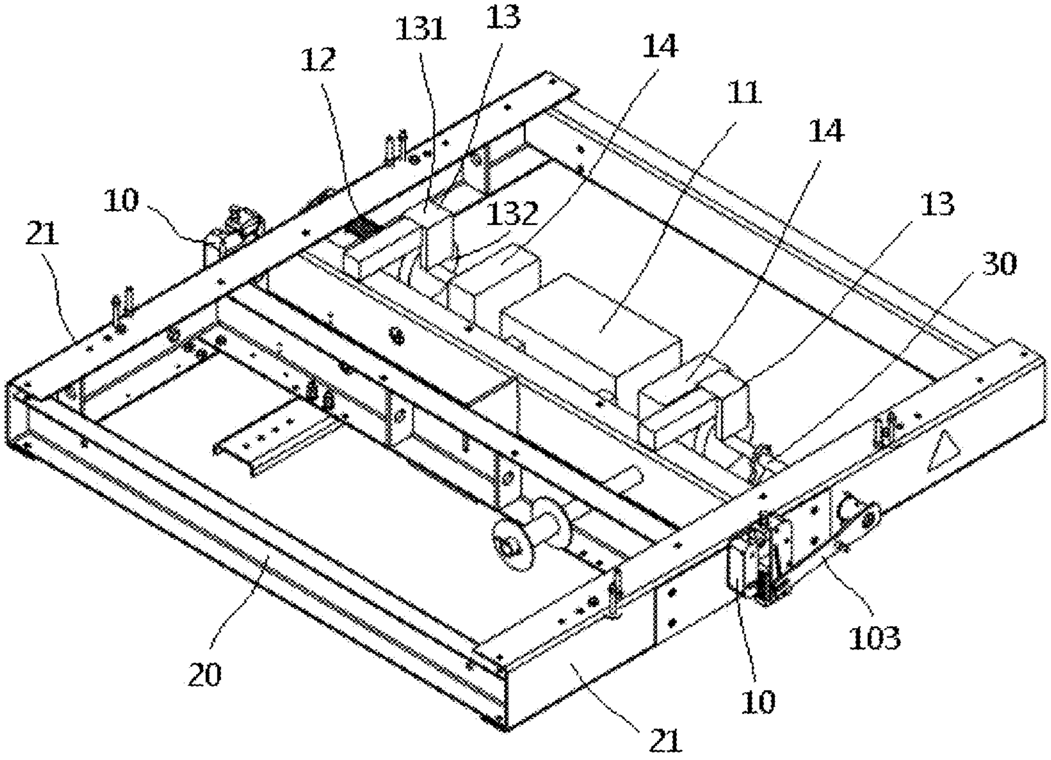
FIG. 4 is a partial structural schematic diagram of another embodiment of the elevator safety clamp control device according to the present disclosure after being installed in an elevator system.

As an example, another embodiment of an elevator safety clamp control device is given, for example, in FIG. 4. In order to avoid repetitive description, unless otherwise specified herein, for the content of the example of FIG. 4 that is identical or similar to that of the example of FIG. 1 as discussed above, reference can be made directly to the corresponding descriptions in the preceding paragraphs. In the embodiment of FIG. 4, a clutch 14 is added, which can be arranged between the power portion 11 and the operating portion 12, for example, installed on an optional connecting rod 30.

By arranging the clutch 14, connection or disconnection operations between the operating portion 12 and the power portion 11 can be realized. In this way, after the power portion 11 powers the operating portion 12 to enter the first state, the connection between the operating portion 12 and the power portion 11 can be cut off by operating the clutch 14, which is very conducive to avoiding or reducing the possible blocking and delaying effect brought about by the power portion 11 when the operating portion 12 releases the energy to actuate the elevator safety clamp. This can effectively promotes the operating portion 12 to more quickly complete the energy release, and prompts the elevator safety clamp 10 to carry out safety actions as quickly as possible, so that the reaction time for safety operation can be guaranteed or even more advantageously shortened compared with the prior art, and the safety performance of the elevator system can be enhanced. In addition, when needed, the clutch 14 can also be operated to re-establish the connection between the operating portion 12 and the power portion 11, so that the power portion 11 can be operated to power the operating portion 12 to enter the first state, or reset the elevator safety clamp 10, and the like.

For another example, although it is shown in the examples of FIG. 1 and FIG. 4 that two elevator safety clamps 10 are arranged in the running device of the elevator system at the same time. For example, two elevator safety clamps 10 are respectively mounted on the two opposite outer side walls 21 of the frame structure 20, and the power portion 11, the control portion 13 and the operating portion 12 in the examples of the elevator safety clamp control device are arranged inside the frame structure 20. However, in different applications, the configuration quantity, arrangement location, installation method, and the like of the above components can be flexibly arranged. For example, in one or some embodiments, one, three, or more elevator safety clamps may be arranged on the running device, and they can be specifically arranged at any suitable location of the top, middle, and bottom of the running device. For another example, the power portion 11 can be centrally arranged inside the frame structure 20, or it can be adjusted to be arranged in other places deviating from the central position. For yet another example, each elevator safety clamp 10 may be separately configured with a power portion 11, an operating portion 12 and a control portion 13, or several elevator safety clamps 10 may be configured with the corresponding operating portion 12 and control portion 13, but these elevator safety clamps 10 may share the same power portion 11, so as to save equipment space and cost.

As another aspect of the present disclosure superior to the prior art, an elevator safety apparatus is further provided. In the elevator safety apparatus, one or more elevator safety clamps may be configured as required, and the elevator safety clamp control device designed and provided according to the present disclosure for cooperating with the elevator safety clamp may be configured accordingly, thereby forming the elevator safety apparatus. It should be understood that the elevator safety apparatus can be arranged at any suitable position on the running device of the elevator system as required, such as at the bottom, top and/or side of the elevator car (or counterweight), etc., so as to better achieve the purpose of safety control of elevator operation, thus safely and reliably delivering various possible objects such as people, pets, goods, etc. to the destination using the elevator system.

In addition, according to the technical solution of the present disclosure, an elevator system is further provided. Specifically, the elevator system may comprise: a hoistway having elevator guide rails, one or more running devices (e.g., elevator cars, counterweights) that can travel within the hoistway along the elevator guide rail, one or more elevator safety clamps, and an elevator safety clamp control device designed and provided according to the present disclosure that is correspondingly configured with the elevator safety clamp, which, through its cooperation with the elevator safety clamp, can achieve the purpose of ensuring and enhancing the safety performance of the elevator system, improving the product quality level and competitiveness. The elevator system according to the present disclosure can be widely applied to lifting transportation equipment in high-rise, middle-rise or low-rise buildings.

The elevator safety clamp control device, the elevator safety apparatus and the elevator system according to the present disclosure are described in detail above by way of examples only. These examples are merely used to illustrate the principles and embodiments of the present disclosure, rather than limiting the present disclosure. Various modifications and improvements can be made by those skilled in the art without departing from the spirit and scope of the present disclosure. Therefore, all equivalent technical solutions should fall within the scope of the present disclosure and be defined by the various claims of the present disclosure.

What is claimed is:

1. An elevator safety clamp control device, comprising:

an operating portion arranged on a running device running along an elevator guide rail and connected to an elevator safety clamp, wherein the operating portion releases kinetic energy when controlled to enter a second state from a first state of energy storage, for actuating the elevator safety clamp to engage with the elevator guide rail to stop the running device;

a control portion configured to control the operating portion to be in the first state, and to control the operating portion to enter the second state from the first state to release kinetic energy when an operating parameter of the running device exceeds a threshold; and a power portion arranged on the running device and connected to the operating portion;

wherein the operating portion comprises an elastic energy storage component mounted to a rotatable connecting rod and the power portion is configured to rotate the rotatable connecting rod to bring the operating portion into the first state and to reset the elevator safety clamp;

wherein the elevator safety clamp is arranged on a frame structure of the running device and is connected to the elastic energy storage component and a power output end of the power portion through the rotatable connecting rod;

wherein the elastic energy storage component is a spring sleeved on the rotatable connecting rod, with one end of the spring mounted on the rotatable connecting rod and the other end mounted on the frame structure.

2. The elevator safety clamp control device according to claim 1, wherein the control portion comprises a first component and a second component, and the first component and the second component are respectively arranged on the frame structure and the rotatable connecting rod and are configured to be operatively engaged, such that when they are engaged, the operating portion is in the first state, and when disengaged, the operating portion is brought into the second state from the first state to release kinetic energy.

3. The elevator safety clamp control device according to claim 1, wherein the control portion is connected to a detector and is configured to determine whether the operating parameter of the running device exceeds the threshold according to a signal from the detector, and wherein the detector comprises a speed sensor, an acceleration sensor or an elevator control system arranged in an elevator system, and the operating parameter comprises running speed data, running acceleration, or a combination thereof.

4. The elevator safety clamp control device according to claim 1, wherein the power portion is connected to an elevator control system in an elevator system, and is configured to provide power according to a signal from the elevator control system.

5. The elevator safety clamp control device according to claim 1, wherein the power portion comprises a motor, the motor and the elevator safety clamp are arranged on a frame structure of the running device, an output shaft of the motor is connected to the elevator safety clamp through the rotatable connecting rod, and the operating portion is connected to the rotatable connecting rod.

6. The elevator safety clamp control device according to claim 1, wherein two or more elevator safety clamps are respectively arranged on a frame structure of the running device, and wherein the power portion, the control portion and the operating portion are arranged inside the frame structure, and the power portion is connected to the elevator safety clamps through ends of the rotatable connecting rod respectively.

7. The elevator safety clamp control device according to claim 6, wherein the power portion is centrally arranged inside the frame structure, and a corresponding control portion and a corresponding operating portion are respectively provided between the power portion and each elevator safety clamp.

8. The elevator safety clamp control device according to claim 1, wherein the elevator safety clamp control device further comprises a clutch arranged between the power portion and the operating portion, such that after the operating portion is brought into the first state when powered by the power portion, the operating portion is disconnected from the power portion by operating the clutch, and when it is necessary to bring the operating portion into the first state or reset the elevator safety clamp, a connection is formed between the operating portion and the power portion by operating the clutch.

9. The elevator safety clamp control device according to claim 8, wherein the elevator safety clamp is arranged on the frame structure of the running device and is connected to the operating portion and the power output end of the power portion through the rotatable connecting rod, and the clutch is arranged on the rotatable connecting rod.

10. The elevator safety clamp control device according to claim 1, wherein the running device is an elevator car and/or a counterweight.

11. The elevator safety clamp control device according to claim 10, wherein the elevator safety clamp control device is arranged inside a frame structure of the elevator car, and the elevator safety clamp is arranged on the frame structure of the elevator car.

12. An elevator safety apparatus, comprising:

the elevator safety clamp control device according to claim 1.

13. An elevator system, comprising:

a hoistway;

and the elevator safety clamp control device according to claim 1.

* * * * *